July 9, 1940.      L. CARL      2,207,579

ELECTRIC CABLE

Filed Jan. 17, 1939

Inventor:
Leonhard Carl,
by Harry E. Dunbury
His Attorney.

Patented July 9, 1940

2,207,579

UNITED STATES PATENT OFFICE 2,207,579

ELECTRIC CABLE

Leonhard Carl, Berlin-Wilmersdorf, Germany, assignor to General Electric Company, a corporation of New York Application January 17, 1939, Serial No. 251,429
In Germany January 12, 1938

2 Claims. (Cl. 173—244)

My invention relates to a process for producing electric cables having fire-resistant insulation, and more particularly to a process of cable construction employing an insulating envelope of ceramic material, such as glass.

It is an object of my invention to provide an improved process for the construction of cables of the type described, which results in a cable of increased electrical efficiency and which permits the cable to be easily assembled and manufactured at low cost.

Figure 1:
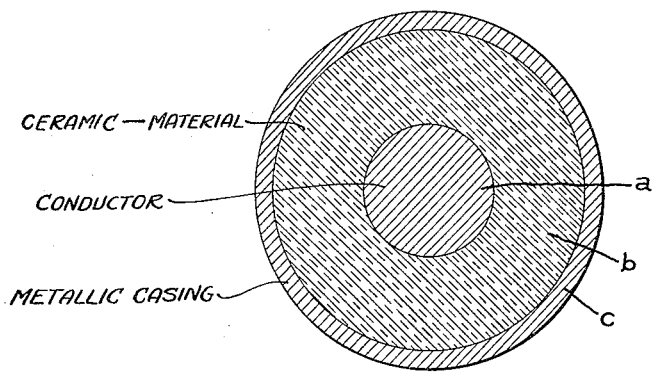
Figure 2:
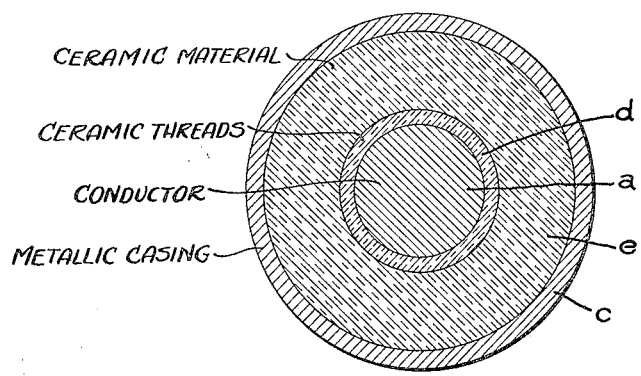
Figure 3:
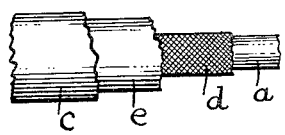

In the accompanying drawing, Fig. 1 is a cross-sectional view through a cable constructed in accordance with my invention, Fig. 2 is a cross-sectional view through a modification of the cable shown by Fig. 1 and Fig. 3 is a longitudinal view of the cable of Fig. 2.

Referring to Fig. 1 of the drawing, I provide a conductor $a$ and over the conductor an envelope $b$ of glass is applied. The glass is heated to a plastic condition and is then either wrapped around or extruded over the conductor to form a core. If desired, the glass may be fused to the conductor to obtain a close bond between the glass and the conductor. An outer metal casing $c$ is placed over the built-up core. The casing may be formed of copper, aluminum, or the like, and may be extruded directly over the core. Alternatively, the built-up core may be cooled and inserted in a preformed metallic casing. After assembly of the cable elements in the manner described and after the plastic glass insulation has solidified the cable is subjected to a drawing or stretching process. This shatters the glass and renders the cable flexible. Moreover, the cable is reduced in size and correspondingly elongated. The drawing processes may be repeated at will to provide a cable having the requisite length and capacity. During the drawing process the conductor, insulation and casing maintain their respective positions. Not only does the drawing process shatter or pulverize the glass insulation but the minute particles of the pulverized glass are compressed tightly around the conductor and provide a very compact and dense insulation.

A cable constructed in accordance with my invention has a high dielectric and mechanical strength. It is fire resistant. It may be easily bent according to the requirements of installation. It is impervious to moisture thereby preserving its high dielectric strength. By applying the glass in a plastic condition to the conductor rod it is possible to secure a very dense and uniform thickness of insulation. By shattering the solidified glass during the drawing operation the cable is rendered flexible and the particles of glass are compressed tightly around the conductor completely eliminating any possible spaces that may have existed between the insulation and conductor.

Figs. 2 and 3 illustrate a cable constructed in a manner to insure a close bond between the conductor and plastic glass insulation. According to this form of the invention, the conductor is first provided with a layer of glass threads $d$ which may be spun around the conductor or applied in the form of a braided glass fabric. If desired, the layer may be made to grip the conductor more closely by the use of a suitable quantity of adhesive. After application of the layer of glass threads a molten layer of glass $e$ is applied directly over the layers of threads and the outer casing $c$ is assembled on the built-up core, the same as in the construction of Fig. 1. The molten glass $e$ permeates between the individual threads of the layer $d$ and thus a close bond between the conductor and glass insulation is obtained. This modified form of the invention has the advantage that a base or gripping surface is provided for the application of the molten glass making it easier to handle and giving a close bond between the insulation and conductor thereby eliminating all air spaces. After assembly of the cable elements, the cable is subjected to a drawing process to shatter the glass and render the cable flexible, the same as in the construction of the cable shown by Fig. 1.

What I claim as new and desire to secure by Letters Patent of the United States is:

1. A process of constructing fire-resistant cable comprising applying a layer of spun glass threads around a conductor, applying a layer of molten glass insulation around said layer of threads to permeate said threads and form a close bond with said conductor, assembling a metallic casing around said layers of insulation and then subjecting said assembly to a drawing operation during which the layers of glass insulation are shattered to render the cable flexible.

2. The process of constructing fire-resistant cable comprising applying a layer of threads formed of a vitreous material around a conductor, applying a layer of molten vitreous insulation around said layer of threads to permeate said threads and form a close bond with said conductor, assembling a metallic casing around said layers of insulation and then subjecting said assembly to a drawing operation during which the layers of vitreous insulation are shattered to render the cable flexible.

LEONHARD CARL.